(12) United States Patent
Baker et al.

(10) Patent No.: US 6,775,231 B1
(45) Date of Patent: Aug. 10, 2004

(54) DYNAMIC WEIGHTED RESOURCE SHARING

(75) Inventors: Frederick Baker, Santa Barbara, CA (US); Qingming Ma, Cupertino, CA (US)

(73) Assignee: Cisco Technology, San Jose, CA (US)

(*) Notice: Subject to any disclaimer, the term of this patent is extended or adjusted under 35 U.S.C. 154(b) by 0 days.

(21) Appl. No.: 09/405,458

(22) Filed: Sep. 24, 1999

(51) Int. Cl.[7] .................................................. H04J 1/16
(52) U.S. Cl. .................... 370/230.1; 370/232; 370/235; 370/395.41; 370/412; 370/429
(58) Field of Search .............................. 370/412, 468, 370/229–230, 230.1, 232–235, 235.5, 395.21, 395.2, 395.41, 395.43, 395.61, 429; 709/226

(56) References Cited

U.S. PATENT DOCUMENTS

| | | | |
|---|---|---|---|
| 5,872,769 A | * 2/1999 | Caldara et al. | 370/230 |
| 5,978,356 A | * 11/1999 | Elwalid et al. | 370/230 |
| 6,304,549 B1 | * 10/2001 | Srinivasan et al. | 370/230 |
| 6,341,134 B1 | * 1/2002 | Toutain et al. | 370/412 |
| 6,377,583 B1 | * 4/2002 | Lyles et al. | 370/412 |
| 6,408,005 B1 | * 6/2002 | Fan et al. | 370/412 |
| 6,434,624 B1 | * 8/2002 | Gai et al. | 709/232 |
| 6,504,819 B2 | * 1/2003 | Fowler et al. | 370/230 |

OTHER PUBLICATIONS

Nichols et al., "Definition of the differential service field (DS Field) in the Ipv4 and Ipv6 headers", 1998, IEFT RFC 2474.
Jacobson et al., "An expedited forwarding PHB", 1999, IEFT RFC 2598.
Blake et al., "An architecture for differential services", 1998, IETF RFC 2475.
Heinanen et al., "Assured forwarding PHB group", 1999, IETF RFC 2597.
Craig Partridge, "Gigabit networking", 1994, Addison Wesley Longman, pp. 276–280.

* cited by examiner

Primary Examiner—Dang Ton
Assistant Examiner—Inder Pal Mehra
(74) Attorney, Agent, or Firm—Ritter, Lang & Kaplan LLP

(57) ABSTRACT

In one embodiment, the technique dynamically adjusts resource allocations for each traffic class based on actual traffic load measured for each service class. In this way, the per-hop-behavior required by a differentiated service model may be achieved. Core nodes of a network operating according to a differentiated service model dynamically adjust resource allocations for multiple traffic classes without requiring explicit signaling from other network nodes. Policies for sharing resources among multiple service classes can be enforced.

28 Claims, 5 Drawing Sheets

DYNAMIC WEIGHTED RESOURCE SHARING

BACKGROUND OF THE INVENTION

The present invention relates to data networking and more particularly to providing differentiated services on an Internet Protocol network such as the Internet.

In order to accommodate a mix of traffic that it will include voice, video, and electronic commerce data, it is envisioned that the Internet will require a scalable architecture for service differentiation. An overall architecture for differentiated services on the Internet is described in Blake, *An Architecture for Differentiated Services,* IETF RFC 2475 (December 1998), the contents of which are herein incorporated by reference. In a differentiated service model, packets forwarded via a network belong to one of a plurality of behavior aggregates. Each packet may include a DS (Differentiated Services) field identifying the aggregate to which the packet belongs.

Traffic entering a network which operates according to a differentiated service model, e.g., a Differentiated Services domain, is classified, possibly conditioned, and assigned to one of the behavior aggregates. Each behavior aggregate defines a per hop forwarding behavior to be implemented at nodes internal to the Differentiated Services domain. The Differentiated Services model achieves scalability by implementing complex classification and conditioning function only at the network boundary nodes. Core nodes apply per hop behaviors to aggregates of traffic which have been appropriately marked using the DS field in the packet headers. The term "per hop behavior" refers to the externally observable forwarding behavior of a node in a Differential Services domain.

An important example of a differentiated service is Assured Forwarding Service. Assured Forwarding is described in Heinanen et al., *Assured Forwarding PHB Group,* IETF RFC 2597 (June 1999), the contents of which are herein incorporated by reference. In the context of a service provider operating a network providing interconnections among various customer networks, Assured Forwarding provides different levels of delivery assurances for IP packets received from customer networks. Four Assured Forwarding classes representing different levels of delivery assurance are defined. Each IP packet employing Assured Forwarding is assigned to one of these Assured Forwarding classes.

To support a Differential Services model such as Assured Forwarding, a network node internal to the service provider network must operate packet schedulers for each of its output interfaces to ensure that each class to be output via the interface receives service corresponding to its defined per hop behavior. It is known to support prioritization among different traffic sources or different classes by using queuing techniques such as Weighted Fair Queuing (WFQ), or Weighted Round-Robin (WRR) queuing. These techniques involve dividing traffic among multiple queues and allocating limited packet forwarding bandwidth among the queues according to weights assigned to each queue.

The difficulty that arises in using either Weighted Fair Queuing or Weighted Round-Robin to support the per hop behaviors required for different Assured Forwarding classes is assigning weights to the different classes. The actual priority levels experienced by different classes at a node will depend on both the weights assigned to those classes and the traffic loads for those classes. The load of each Assured Forwarding class changes over time as flows are created and torn down. However, the prior art Weighted Fair Queuing and Weighted Round-Robin techniques use weights that do not change over time.

If each Assured Forwarding class keeps the same weight as its traffic load varies, relative priority levels may also vary thereby violating the requirements of the IETF specification. For example, Assured Forwarding requires that packets of a class, i, must be forwarded in a more timely fashion than packets of a class, j, when i>j. However, if the weights assigned to class i and class j both stay constant as class i experiences significant increases in traffic load while class j traffic load remains constant, then packets of class i may start experiencing significantly more average delay than packets of class j, contradicting the IETF specification.

Furthermore, statically partitioning link resources among Assured Forwarding classes can result in low resource utilization. If current traffic completely consumes resources statically allocated to a particular class, packet flow may be blocked even though resources statically allocated to other classes are available.

It should also be noted that current specifications do not provide explicit signaling for flow connections and tear down. Therefore, not only will traffic vary among classes at interior nodes but interior nodes will be given no information generally characterizing the traffic distribution. Any scheme to explicitly communicate changes in traffic distribution to interior nodes would not scale with increased numbers of such nodes.

SUMMARY OF THE INVENTION

A packet scheduling technique that supports multiple classes of service is provided by virtue of the present invention. In one embodiment, the technique dynamically adjusts resource allocations for each traffic class based on actual traffic load measured for each service class. In this way, the per hop behavior required of each class by a differentiated service model may be achieved. Core nodes of a network operating according to a differentiated service model dynamically adjust resource allocations for multiple traffic classes without explicit signaling from other network nodes. Policies for sharing resources among multiple service classes can be enforced.

According to one aspect of the present invention, a method is provided for allocating network resources to a plurality of data communication service classes. The method includes measuring packet flow characteristics at a packet forwarding device for each of the plurality of service classes, determining resource allocation weights for each of the plurality of service classes based on the measured packet flow characteristics, and allocating a shared packet forwarding resource among the plurality of service classes according to the weights.

A further understanding of the nature and advantages of the inventions herein may be realized by reference to the remaining portions of the specification and the attached drawings.

DESCRIPTION OF SPECIFIC EMBODIMENTS

Generally, the packet processing and management techniques of the present invention may be implemented in software and/or hardware. For example, they can be implemented in an operating system kernel, in separate user processes, in a library package bound into a network application, on a specially constructed machine, or on a network interface card. In specific embodiment of this invention, these techniques may be implemented in software such as an operating system or in an application running on an operating system.

A software or software/hardware hybrid packet processing and management system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the packet processing and management systems of this invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
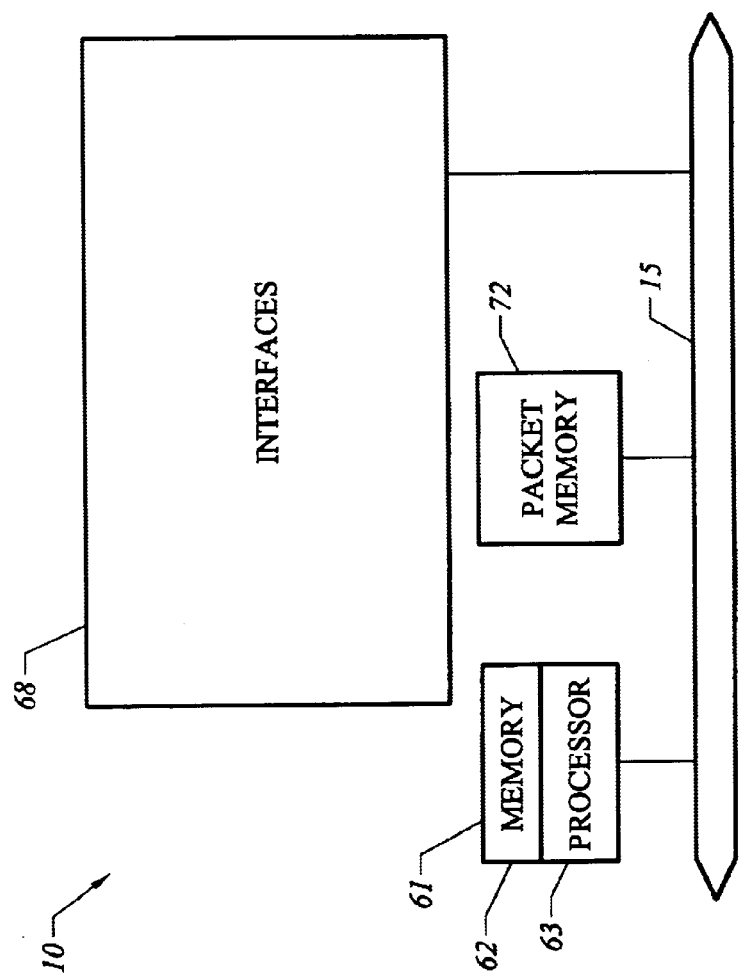
FIG. 1 is a simplified diagram of router hardware suitable for implementing one embodiment of the present invention.

Referring now to FIG. 1, a router 10 suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system (e.g., a version of the Internetwork Operating Systems (IOS®) of Cisco Systems, Inc.) and any appropriate applications software. CPU 61 may include one or more processors 63 such as a processor from the Motorola family or MIPS family of microprocessors. In an alternative embodiment, processor 63 is specially designed hardware for controlling the operations of router 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 10 may further include a packet memory 72 for intermediate storage of packets being forwarded by router 10.

Although the system shown in FIG. 1 is one specific router of the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memory 62) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 2:
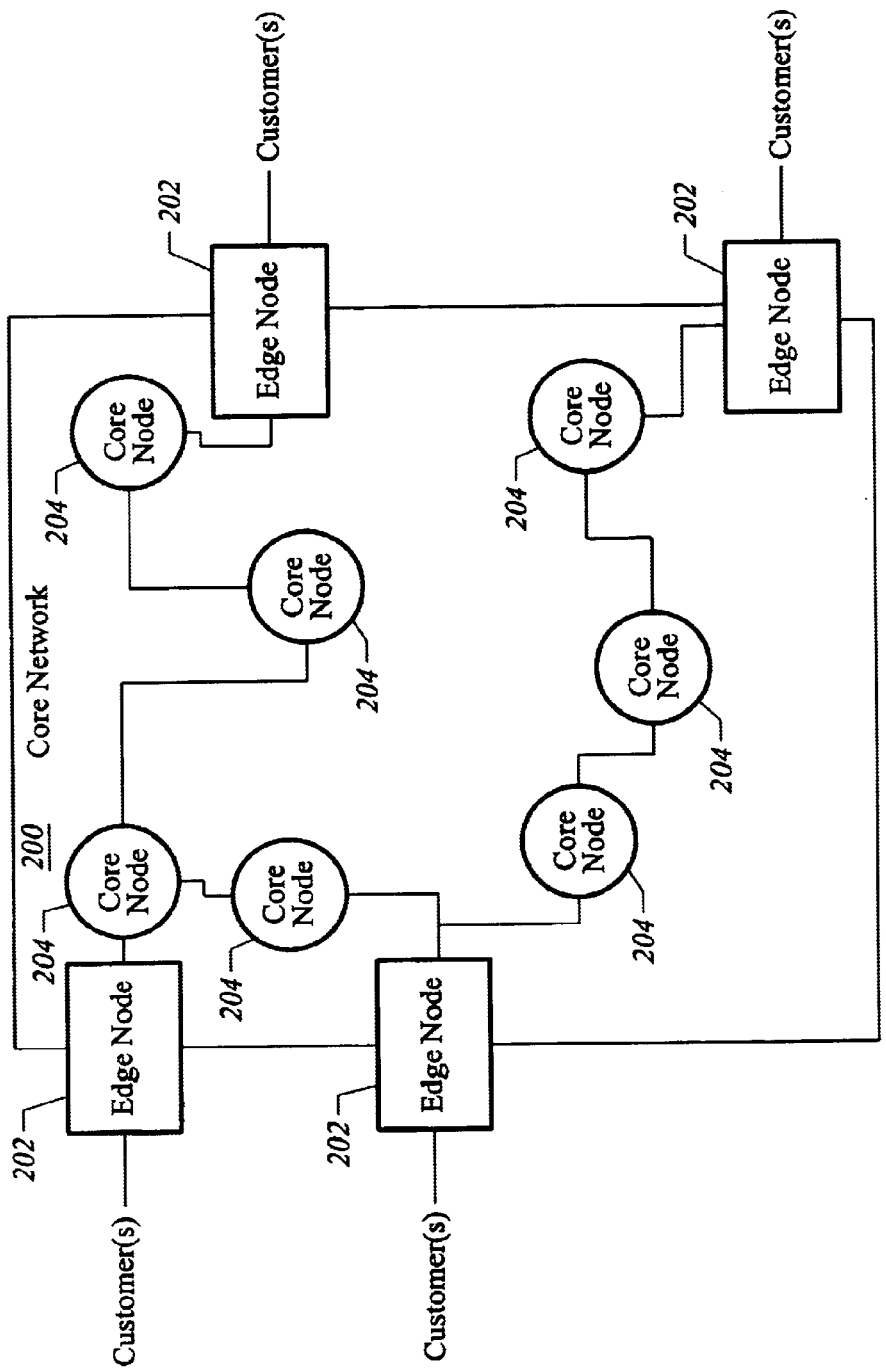
FIG. 2 depicts a network implementing differentiated services according to one embodiment of the present invention.

FIG. 2 depicts a network 200 that implements a differentiated service model. In one embodiment, network 200 is a service provider network. Edge nodes 202 provide connections to service provider customers. Core nodes 204 relay packets through network 200. In another embodiment, network 200 is a corporate intranet and edge nodes 202 provide connections to individual corporate users.

Network 200 represents a Differentiated Services domain. Edge nodes 202 classify incoming traffic into one of a plurality of behavior aggregates. In one embodiment, network 200 implements an Assured Forwarding service and edge nodes 202 classify packets to be forwarded into network 200 into one of four service classes. The service class of a packet defines the required per-hop-behavior of each of core nodes 204 in processing that packet. For example, for the four Assured Forwarding service classes, it may be required that each class j should be allocated more resources than each class i whenever j is greater than i. Another aspect of per hop behavior may be that each core node 204 should allocate $x_i\%$ more packet forwarding resources to service class i than to class 1. Each core node 204 would then be required to allocate its output interface bandwidth to conform to these rules.

Various techniques have been developed for scheduling transmission of packets via a packet forwarding resource such as an output interface so that limited packet forwarding bandwidth is correctly distributed among multiple classes of packet. Two such techniques are Weighted Fair Queuing and Weighted Round-Robin. These techniques are described in Partridge, *Gigabit Networking* (Addison Wesley Longman 1994), pp. 276–280, the contents of which are herein incorporated by reference.

To employ either of these techniques, one must set weights for the different packet classes which are here the different Assured Forwarding classes. At edge nodes 202, these weights are generally preset by contract or by organizational policy. According to one embodiment of the present invention, these weights are set dynamically based on measured traffic loads for each of the service classes at core nodes 204.

Figure 3:
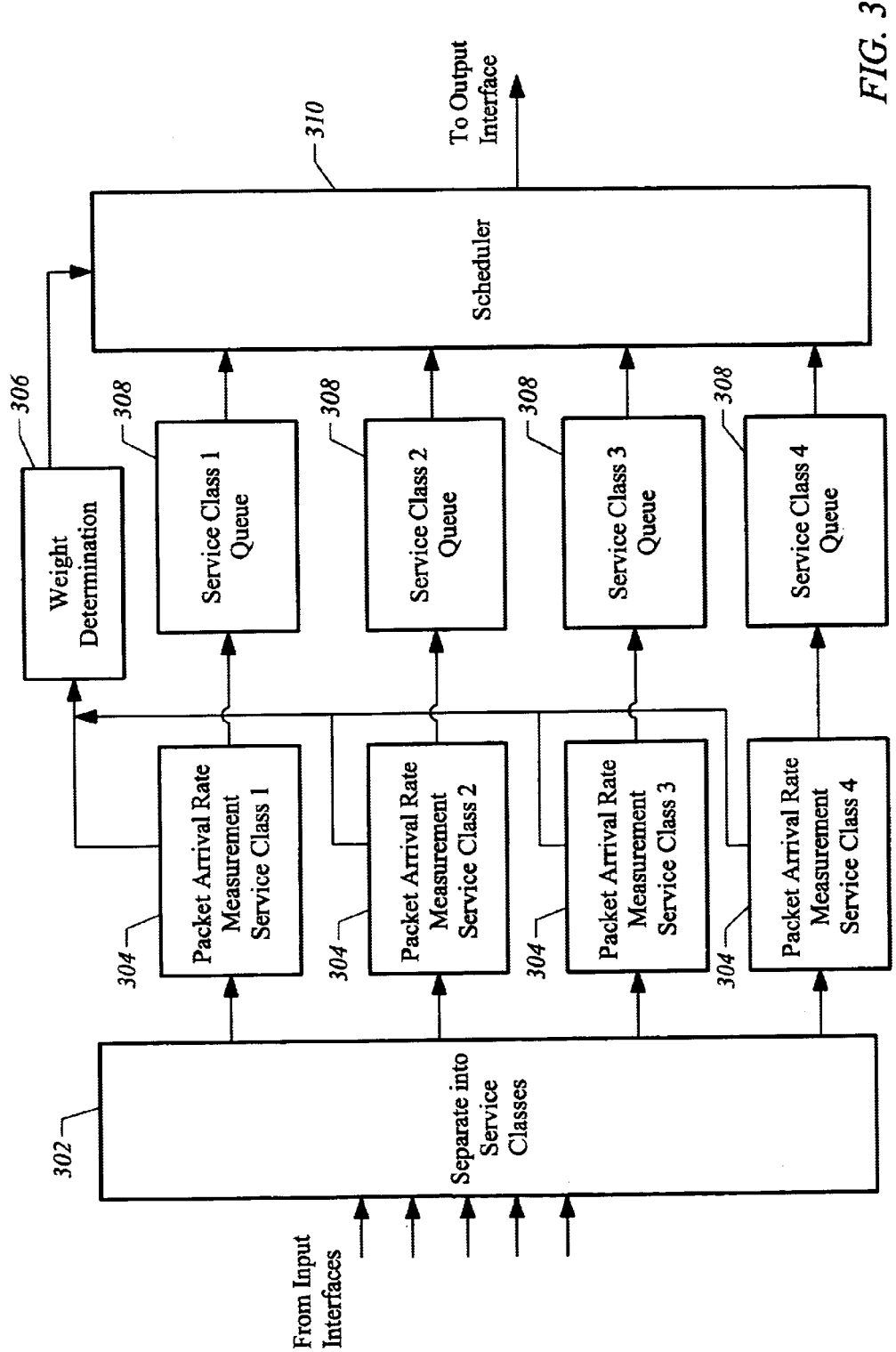
FIG. 3 depicts packet forwarding and scheduling operations according to one embodiment of the present invention.

FIG. 3 depicts a functional block diagram of router 10 that may operate to implement one of core nodes 204. It is assumed that packets being forwarded within network 200 have been assigned to one of the Assured Forwarding classes. A classifier 302 checks a special Differentiated Services field of each packet header to identify the packet's Assured Forwarding class. The packets are separated by Assured Forwarding class. A measurement system 304 monitors the packet arrival rate for each service class. A weight determination block 306 periodically determines new Weighted Fair Queuing or Weighted Round-Robin weights based on the packet arrival rate measurements for each service class. A separate queue 308 is provided for each service class. Each new packet is enqueued at the back of its service class queue.

A scheduler 310 selects packets for transmission via an output interface or virtual connection from queues 308. Scheduler 310 selects packets for transmission via the output interface based on, e.g., a Weighted Fair Queuing or a Weighted Round-Robin scheme incorporating the weights generated by weight determination block 306.

FIG. 3 shows the allocation of a single packet forwarding resource such as a single output interface or single virtual connection. However, a single example of router 10 may incorporate multiple instances of the components of FIG. 3 to correspond to multiple output interfaces, for example.

Figure 4:
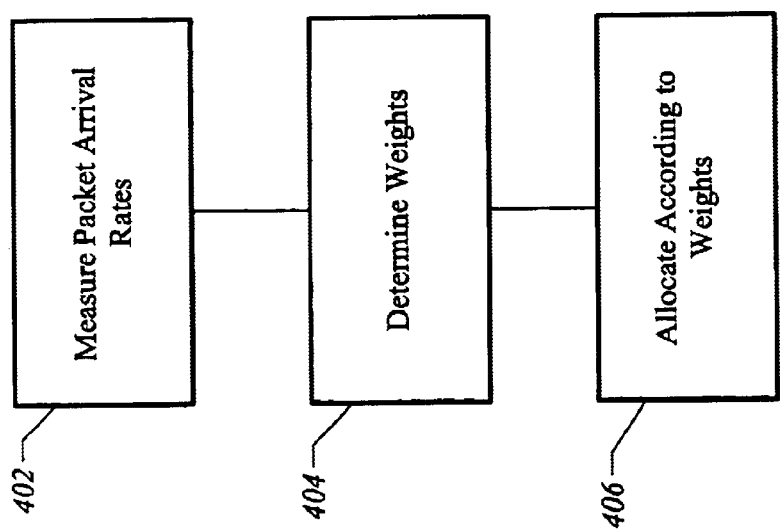
FIG. 4 is a flowchart describing steps of allocating limited output interface bandwidth according to one embodiment of the present invention.

FIG. 4 is a flowchart describing the dynamic weight adjustment process at a high level. At step 402 the packet arrival rates are measured for each Assured Forwarding class. At step 404 the resource allocation weights are determined based on the measured packet arrival rates. At step 406, scheduler 310 allocates a shared packet forwarding resource among the multiple service classes in accordance with the weights determined at step 404. Although steps 402, 404, and 406 are depicted sequentially, they preferably represent concurrent processes.

Figure 5:
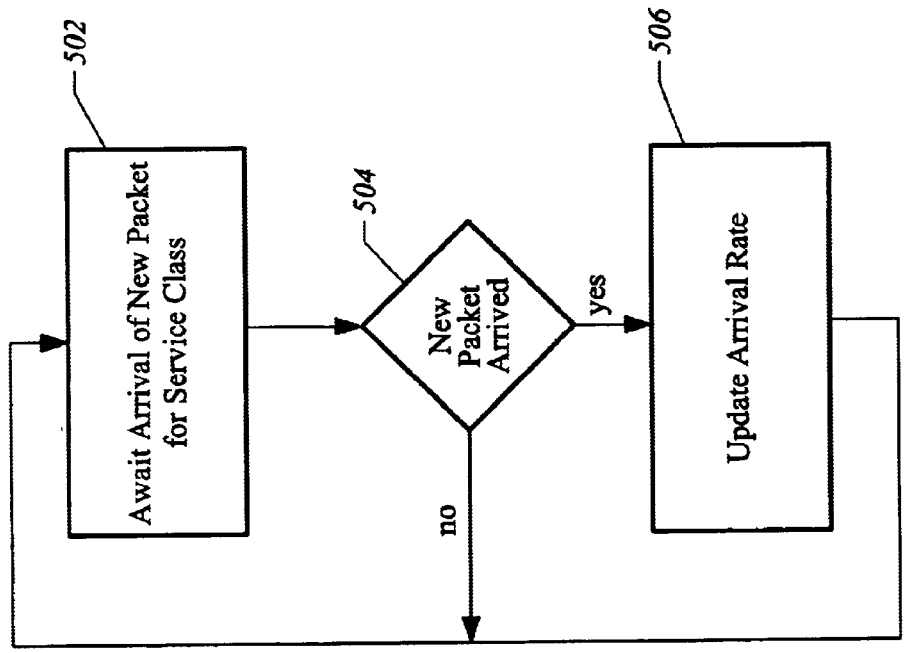
FIG. 5 is a flowchart describing steps of monitoring packet arrival rate for individual service classes according to one embodiment of the present invention.

FIG. 5 is a flowchart describing steps of the packet arrival rate measurement process for a given Assured Forwarding Service class. The packet arrival rate can be updated every time a new packet of the service class is received. At step 502, the measurement process awaits arrival of a new packet for the service class. Step 504 tests for whether a new packet has arrived. If a new packet has not arrived the measurement process returns to step 502. If a new packet has arrived the arrival rate is updated at step 506.

In one embodiment, an exponential averaging process is used to determine the packet arrival rate for each service class every time a new packet arrives. Let $t_k$ be the arrival time of a new packet and let $l_k$ be the length of the new packet where K is a sequential identifier identifying the new packet. The new estimated packet arrival rate is then:

$$r_{new} = (1 - e^{-T_k/K})\frac{l_k}{T_K} + e^{-T_k/K} r_{old}$$

where $$T_k = t_k - t_{k-1},$$

and where K is a constant.

Using the exponential expression $$e^{-T_k/K}$$

as an averaging weight instead of using a constant allows the averaging process to be more independent of the packet length distribution. There are several tradeoffs in selecting the constant K. While a small K increases the system responsiveness to rapid rate fluctuation, a large K better filters noise-like variation in the packet arrival rate and avoids potential system instability.

Figure 6:
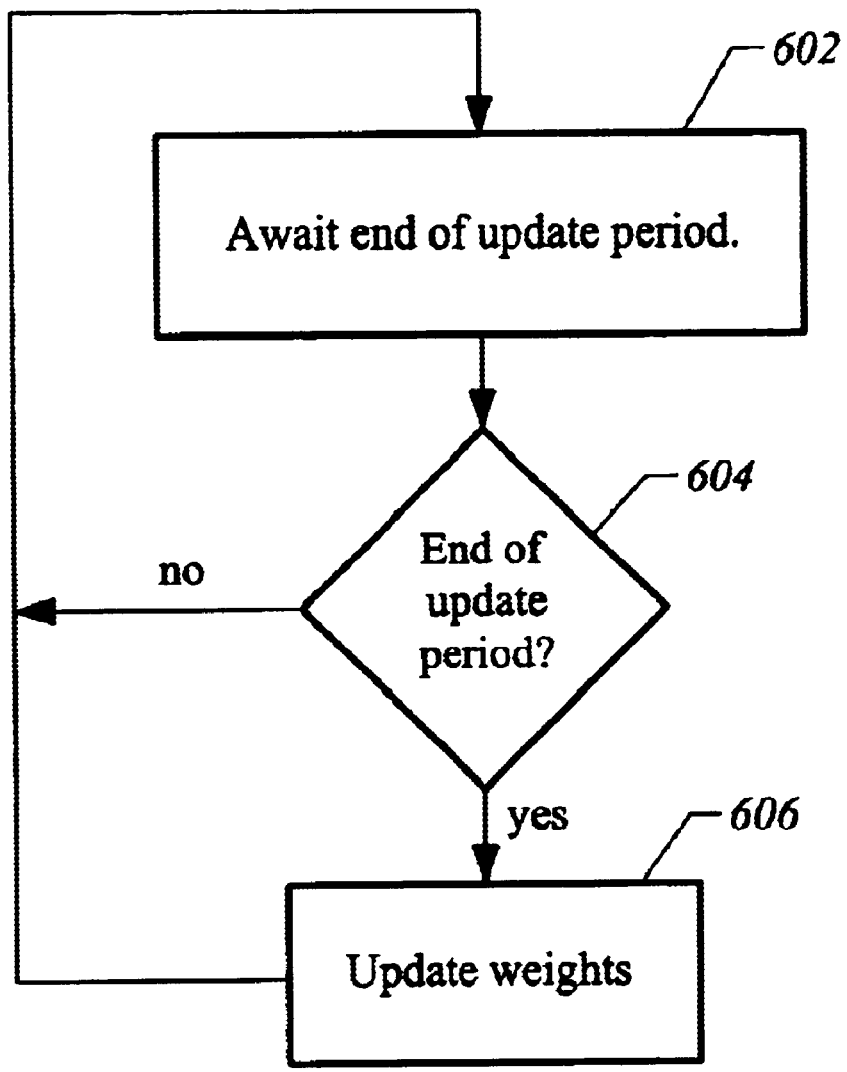
FIG. 6 is a flowchart describing steps of updating resource allocation weights according to one embodiment of the present invention.

Alternatively, a constant, $\alpha$, is used for the averaging weight. The arrival rate is $$r_{new} = (1 - \alpha)\frac{l_k}{T_K} + \alpha r_{old}$$

then estimated as:

FIG. 6 is a flowchart describing steps of updating resource allocation weights according to one embodiment of the present invention. In one embodiment, weights are updated for every interval T. At step 602, the updating processing awaits the end of an update interval. Step 604 is a decision step testing for the completion of the update interval. If the update interval has not yet completed, processing returns to step 602. If the weight update interval has completed, the weights are updated at step 606.

By definition, $$\sum_{i=1}^{n} W_i = 1$$

where $W_i$ is the resource allocation weight used for a class i and n is the number of service classes.

Assuming a policy that the service class i should receive $x_i\%$ more resources than class 1, the following relationship should hold true.

$$\frac{W_i}{r_i} = (1 + x_i\%)\frac{W_1}{r_1}$$

where $r_i$ is the current measured arrival rate for class i.

The weight for service class 1 is then determined by $$W_1 = \frac{r_1}{\sum_{i=1}^{n}(1 + x_i\%)r_i}$$

which can be derived from the previous expressions by algebra.

The weight for the other service classes i is then:

$$W_i = (1 + x_i\%)\frac{r_i}{r_1}$$

The dynamic weight adjustment process described above inherently allocates more resources to a service class when the traffic load of that service class increases. By appropriately selecting the weight update interval T one can decide how responsive the Weighted Fair Queuing or Weighted Round-Robin scheduling algorithm will be to variations in traffic load.

When a new connection is created across network 200 belonging to a service class i the packet arrival rate for class i will increase. Increase in the estimated arrival rate $r_i$ will then automatically result in a adjustment of the weight $W_i$ allocated to that service class at all core nodes 204. There is no need for explicit signaling between nodes to direct the weight adjustment.

There is no need to modify the Weighted Round-Robin or Weighted Fair Queuing scheduling algorithms themselves. The prior art scheduling algorithms now may make use of the dynamically adjusted weights.

When the packet arrival rate increases for a given service class, the time sequence for forwarding new packets should be maintained so that the oldest packet for given services class is always sent first. With the class-based queuing scheme shown in FIG. 3, this is accomplished by enqueuing the newest packet received for a service class at the end of the corresponding service class queue.

It is understood that the examples and embodiments are described herein are for illustrative purposes only and that various modifications and changes in light thereof will be suggested to persons skilled in the art and are to be included within the spirit and perview of this application and scope of the appended claims and their full scope of equivalents. For example, the resource allocation technique described here may also be applied to Expedited Forwarding per hop behavior rules. All publications, patents, and patent applications cited herein are hereby incorporated by reference.

What is claimed is:

1. A method for allocating network resources to a plurality of data communication service classes, said method comprising:

measuring a packet flow characteristic at a packet forwarding device for each of said plurality of service classes;

based on said measured packet flow characteristics, determining resource allocation weights for each of said plurality of service classes;

allocating a shared packet forwarding resource among said plurality of service classes according to said weights;

repeating measuring and determining at periodic intervals; and wherein said resource allocation weights are determined to satisfy predetermined ratios of resource allocation among classes.

2. The method of claim 1 wherein said packet flow characteristic comprises packet arrival rate.

3. The method of claim 2 wherein measuring packet arrival rate comprises:

applying an exponential averaging technique to measured arrival times of packets arriving at said packet forwarding device.

4. The method of claim 1 wherein allocating comprises allocating according to a weighted round robin scheme.

5. The method of claim 1 wherein allocating comprises allocating according to a weighted fair queuing scheme.

6. The method of claim 1 wherein determining resource allocation weights is performed independent of instructions from other network nodes.

7. The method of claim 1 wherein said service classes comprise Assured Forwarding classes.

8. The method of claim 1 wherein said resource allocation weights are determined to satisfy per hop behavior criteria for each of said service classes.

9. The method of claim 1 further comprising:

classifying packets received at said packet forwarding device based on a differentiated service designation specifying service class; and scheduling said packets for transmission via said shared packet forwarding resource based on said weights, wherein said packet forwarding resource comprises an output interface.

10. The method of claim 1 wherein said shared packet forwarding resource comprises an output interface.

11. A packet forwarding system comprising:

an input interface system receiving packets belonging to a plurality of service classes;

a packet monitoring system that measures packet flow characteristics for each of said plurality of service classes;

a weight determination system that determines resource allocation weights for each of said service classes based on said packet flow characteristics; and a packet forwarding resource that forwards said packets in an order determined in response to said resource allocation weights; and wherein said weight determination block selects resource allocation weights so as to enforce a predetermined ratio of resource allocations among said service classes; and wherein said weight determination system updates said resource allocation weights periodically.

12. The system of claim 11 wherein said packet monitoring system comprises a packet arrival rate measurement system that measures packet arrival rates.

13. The system of claim 11 further comprising:

a scheduler that allocates packet transmission time of said packet forwarding resource based on said resource allocation weights.

14. The system of claim 13 wherein said scheduler comprises a weighted fair queuing scheduler.

15. The system of claim 13 wherein said scheduler comprises a weighted round robin scheduler.

16. The system of claim 11 wherein said packet forwarding resource comprises an output interface.

17. The system of claim 11 wherein said weight determination block selects resource allocation weights so as to enforce per hop behavior criteria specified for each of said service classes.

18. A computer program product for allocating network resources to a plurality of data communication service classes, said product comprising:

code that causes measurement of packet flow characteristics at a packet forwarding device for each of said plurality of service classes;

code that, based on said measured packet flow characteristics, causes determination of resource allocation weights for each of said plurality of service classes;

code that causes allocation of a shared packet forwarding resource among said plurality of service classes according to said weights;

code that causes repeated application of said measurement causing code and said determination causing code at periodic intervals; and a computer-readable storage medium that stores the codes; and wherein said resource allocation weights are determined to satisfy predetermined ratios of resource allocation among classes.

19. The product of claim 18 wherein said packet flow characteristics comprise packet arrival rates.

20. The product of claim 18 wherein said code that causes allocation comprises code that causes allocation according to a weighted round robin scheme.

21. The product of claim 18 wherein said code that causes allocation comprises code that causes allocation according to a weighted fair queuing scheme.

22. The product of claim 18 wherein said code that causes determination of resource allocation weights operates independently of signaling from other network nodes.

23. The product of claim 18 wherein said resource allocation weights are determined to satisfy predetermined ratios of weights among classes.

24. The product of claim 18 wherein said code that causes determination of packet flow characteristics comprises:

code that causes application of an exponential averaging technique to measured arrival times of packets arriving at said packet forwarding device.

25. The product of claim 18 wherein said service classes comprise Assured Forwarding classes.

26. The product of claim 18 wherein said resource allocation weights are determined so as to satisfy per hop behavior criteria for each of said service classes.

27. The product of claim 18 further comprising:

code that causes classification of packets received at said packet forwarding device based on a differentiated service designation specifying service class; and code that causes scheduling of said packets for transmission via said shared packet forwarding resource based on said weights, wherein said packet forwarding resource comprises an output interface.

28. Apparatus for allocating network resources to a plurality of data communication service classes, said apparatus comprising:

means for measuring a packet flow characteristic at a packet forwarding device for each of said plurality of service classes;

means for, based on said measured packet flow characteristics, determining resource allocation weights for each of said plurality of service classes;

means for allocating a shared packet forwarding resource among said plurality of service classes according to said weights; and means for repeatedly invoking said measuring means and said determining means at periodic intervals; and wherein said resource allocation weights are determined to satisfy predetermined ratios of resource allocation among classes.

* * * * *